United States Patent [19]

Abe et al.

[11] Patent Number: 5,309,560

[45] Date of Patent: May 3, 1994

[54] DATA SELECTION DEVICE

[75] Inventors: Sachiyuki Abe; Hisao Sato; Hiroaki Nasu; Yasuaki Hagiwara, all of Suwa, Japan

[73] Assignee: Seiko Epson Corporation, Tokyo, Japan

[21] Appl. No.: 961,043

[22] Filed: Oct. 13, 1992

Related U.S. Application Data

[63] Continuation of Ser. No. 197,863, May 24, 1988, abandoned.

[30] Foreign Application Priority Data

May 25, 1987 [JP] Japan ............... 62-127411
Jan. 13, 1988 [JP] Japan ............... 63-5083

[51] Int. Cl.$^5$ .................................. G06F 15/72
[52] U.S. Cl. ................................... 395/166; 395/164
[58] Field of Search .............. 340/703, 748, 750, 798, 340/799; 364/200 MS File, 900 MS File; 395/162, 163, 164, 165, 166

[56] References Cited

U.S. PATENT DOCUMENTS

| | | | |
|---|---|---|---|
| 4,346,366 | 8/1982 | Kajima et al. | 340/146.3 R |
| 4,622,632 | 11/1986 | Tanimoto et al. | 364/200 |
| 4,794,932 | 1/1989 | Baba | 128/661.09 |
| 4,812,988 | 3/1989 | Duthuit et al. | 364/522 |
| 4,857,905 | 8/1989 | Ogawa | 340/748 |
| 4,885,703 | 12/1989 | Deering | 364/522 |
| 4,899,136 | 2/1990 | Beard et al. | 340/706 |
| 4,939,507 | 7/1990 | Beard et al. | 340/706 |

Primary Examiner—Phu K. Nguyen
Attorney, Agent, or Firm—Blum Kaplan

[57] ABSTRACT

A data selection device having $M+1$ stages. Each stage has stored therein prioritized data. Selection of the highest prioritized data available at any instant in time is based on a comparison repeated M times of both the selectability and priority of data available from two different stages of the device. The highest prioritized data is provided at the output of the $M+1$ stage.

42 Claims, 5 Drawing Sheets

DATA SELECTION DEVICE

This is a continuation of application Ser. No. 07/197,863, filed May 24, 1988, now abandoned.

BACKGROUND OF THE INVENTION

This invention relates generally to a data selection device, and more particularly to an image display controlling apparatus in which a data selection device is used for selecting one of a plurality of superimposed images commonly referred to as "sprites" on a screen of a raster scanning device.

Video display controlling apparatus capable of producing sprites must be able to move the sprites to any desired position on the screen. Each sprite is assigned a priority value. When two or more sprites have coordinates which overlap each other, only the sprite having the highest priority value will be displayed on the screen.

Figure 1:
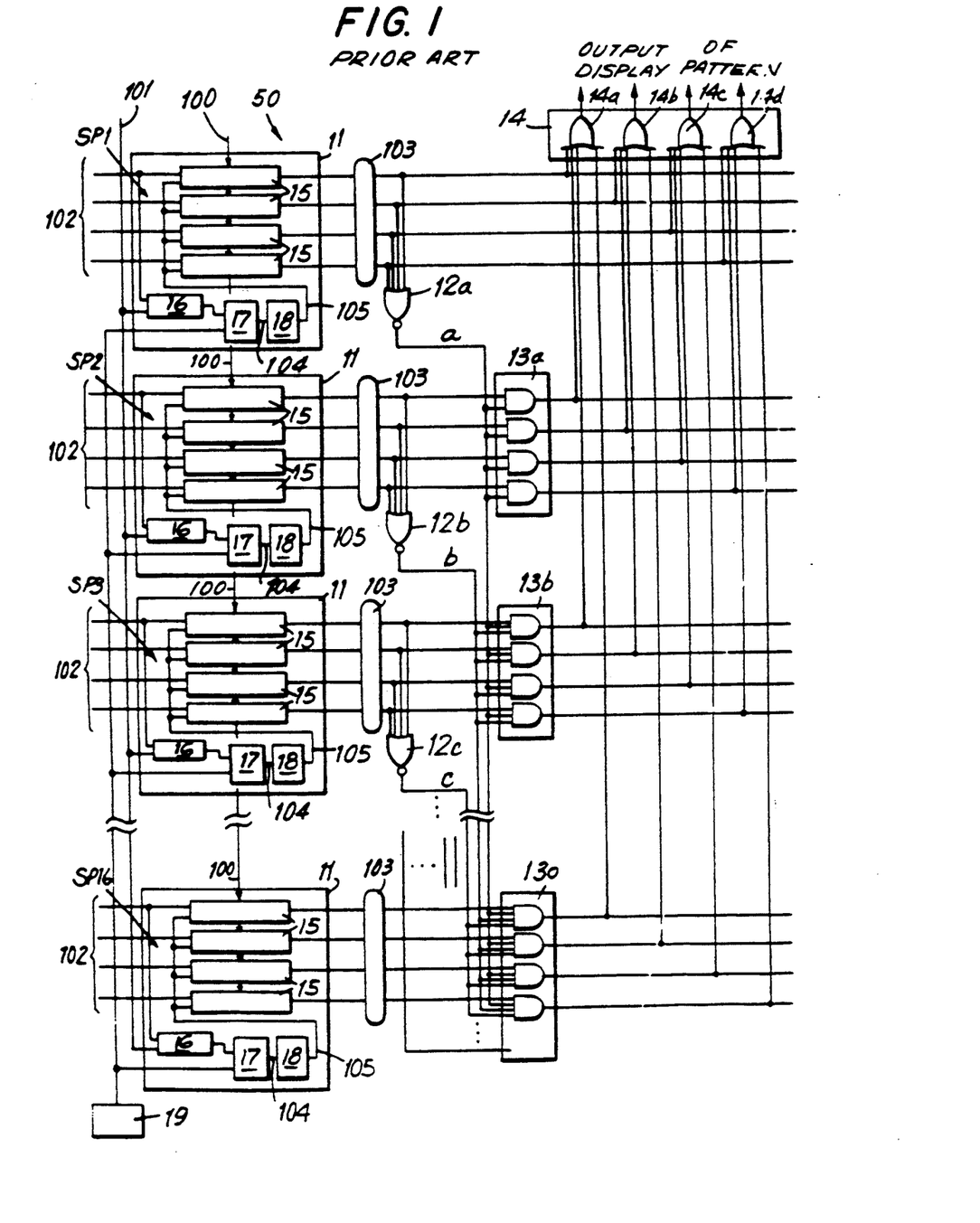
FIG. 1 is a circuit diagram of a prior art data selection device.

A conventional data selection device 50 for determining the priority order of a plurality of sprites is shown in FIG. 1. Device 50 can store sixteen different sprites, each having a width of 16 dots (i.e. pixels) along a horizontal scanning line of a screen of a cathode ray tube. Each dot is described by a 4 bit word of data. Each word of data can represent one of sixteen different types of characteristics concerning the dot. For example, each 4 bit word can represent one of sixteen different colors.

Device 50 includes sixteen different circuit blocks SP1-SP16 each of which includes a pattern shift circuit 11. Each pattern shift circuit 11 has four shift registers 15 each of which has a length of 16 bits. Each pattern shift circuit 11 also includes a latch circuit 16 for storing an X coordinate representing the position along the horizontal scanning line of the screen at which the 4 bit word of sprite data is to be displayed. A comparator 17 and a clock control circuit 18 are also included in each pattern shift circuit 11.

The sprite data to be displayed is stored within four shift registers 15 of each pattern shift circuit 11. Storage of the sprite data takes place during the horizontal blanking period of a cathode ray tube (CRT) just prior to the horizontal scanning line on which the sprite data is to be displayed. Parallel transmission of sprite data to shift registers 15 is provided through pattern input signal lines 100. Each shift register 15 stores the sprite data based on read-in clock signal CK which is supplied to shift registers 15 along read-in clock signal lines 102. Sprite data is stored first in circuit SP1 and then sequentially in circuits SP2-SP16.

As the data for each pattern shift circuit 11 is stored within its corresponding shift registers 15, the corresponding display coordinate (i.e. X-coordinate) is stored in a corresponding latch circuit 16 through an input line 101. A horizontal dot counter 19, which maintains a count corresponding to the point along the horizontal scanning line at which the beam from the CRT is located, is connected to each comparator 17 of each pattern shift circuit 11. Each comparator 17 compares the count value supplied by horizontal dot counter 19 to the value stored in an associated latch circuit 16. For example, when the values supplied from horizontal dot counter 19 and latch 16 of circuit SP1 are the same, comparator 17 of circuit SP1 produces a detection signal 104. Clock control circuit 18 of circuit SP1 upon receiving detecting signal 104 outputs a clock control signal 105 to each of the four shift registers 15 of circuit SP1. Sprite data stored within these shift registers 15 is sequentially outputted along four output lines 103 in synchronism with the clock control signal 105.

Connected to output lines 103 of circuit SP1 are four OR gates 14a, 14b, 14c and 14d of an OR circuit 14. Each of the OR gates 14a, 14b, 14c and 14d has sixteen inputs. Output lines 103 of circuit SP1 are also connected to four input terminals of a NOR gate 12a. NOR gate 12a produces a signal "a".

Each circuit block SP2-SP16 has an AND circuit 13a-13o, respectively. Each AND circuit 13a-13o has four AND gates. Output lines 103 of each circuit block SP2-SP16 are connected to first input terminals of the four gates of the associated AND circuit 13a-13o. The second input terminal of the four gates of AND circuits 13a-13o is connected to the output of NOR gate 12a. The outputs from each of the four gates of AND circuit 13a-13o are connected to one of the four gates 14a, 14b, 14c and 14d of OR circuit 14, respectively.

Each circuit block SP2-SP15 also includes a NOR gate 12b, 12c connected at its input to the output lines 103. As shown in FIG. 1, NOR gate 12b produces a signal "b" and NOR gate 12c produces a signal "c". In each circuit block for SP2-SP15 the output of each NOR gate is connected to an input of each gate within each AND circuit 13 of each higher numbered circuit block. For example, the output of NOR gate 12b of circuit block SP2 is connected as an input to AND gates 13b-13o. The output of NOR gate 12c of circuit block SP3 is connected as an input to AND gates 13c-13o.

Sprite data stored in each pattern shift circuit 11 is assigned a different priority value with the highest priority given to sprite data stored in circuit block SP1 and the lowest priority given to the sprite data stored in SP16 (i.e. the lower the number of the SP circuit, the higher its priority).

A four bit word of data having a value of (0,0,0,0) is considered non-selectable sprite data. For example, a word having a value of (0,0,0,0) describes the color of a dot considered transparent and would not be selected by device 50 (i.e. no selectable data exists). If selectable data does exist then at least one of the four bits of the word appearing on output lines 103 has a high logic level (i.e. a logic level of 1).

When selectable data exists on output lines 103 of circuit block 103, signal "a" of NOR gate 12a has a logic level of 0. Since signal "a" is provided as an input to each gate of AND circuits 13a-13o, AND circuits 13a-13o output logic levels of 0. Therefore, the output from OR circuit 14 represents the pattern shift data stored within pattern shift circuit 11 of circuit block SP1.

When the outputs from shift registers 15 of circuit block SP1 (i.e. output lines 103) have a value of (0,0,0,0) a nonselectable data group exists. Signal "a" of NOR gate 12a changes to a logic level of 1. If selectable data exists on output lines 103 of circuit block SP2 signal "b" of NOR gate 12b assumes a logic level of 0. Since signal "b" is fed as an input to each of the gates of AND circuits 13b-13o, AND circuits 13b-13o assume a logic level of 0. Consequently, the outputs from OR circuit 14 will represent the pattern shift data stored within pattern shift circuit 11 of circuit block SP2.

Each of the remaining circuit blocks SP3-SP15 has a NOR gate (e.g. NOR gate 12c) which operate in a similar manner as NOR gates 12a and 12b to disable AND circuits 13c-13o, respectively. In other words, data selection device 50 provides a scheme which permits only data stored in the highest prioritized pattern shift circuit 11 to be supplied as the display pattern through OR circuit 14. Selectable data existing in circuit block SP1 has the highest priority and will be chosen over any other selectable data existing in any other circuit block. Selectable data existing in circuit block SP16 has the lowest priority and never will be chosen over any other selectable data existing in any other circuit block.

Data selection device 50 has several drawbacks. More particularly, NOR gate 12a is connected to more AND gates than is NOR gate 12b which is connected to more AND gates than is NOR gate 12c. In other words, each of the NOR gates of device 50 is connected to a different number of AND gates resulting in a different load across each output of each NOR gate. Signals "a", "b", "c"...produced from each of these NOR gates has a different delay time due to the different output loads. For example, the delay time of signal "a" is longer than the delay time of signal "b" which is longer than the delay time of signal "c".

The number of inputs for each of the AND gates varies depending on the SP circuit block and increases in number as the number of the SP circuit block increases. Generally, the larger the number of inputs for an AND gate the longer the delay time in providing an output signal therefrom. Accordingly, when the sprite data for SP16 is chosen, an unacceptably large access time is required. For high speed access applications, such delay times are undesirable.

The size of an integrated circuit should be as small as possible and is based on the number of logic gates which are required and the size of each logic gate required. The greater the number of inputs for any particular logic gate, the greater the size of the integrated circuit. Device 50 requires an integrated circuit having an undesirably large size.

Since each AND circuit 13a-13o of circuit blocks SP2-SP16 has a different number of inputs, standardization of the gates is not possible. Manufacture of AND circuits 13a-13o is also a problem since each AND circuit 13a-13o has a different size due to the different number of inputs required for each AND 13a-13o. The area occupied by each AND circuit 13a-13o is different complicating their layout on a semiconductor chip. The area occupied by wires associated with each AND gate 13a-13o also varies. For the foregoing reasons, device 50 requires too much space on a semiconductor chip.

Accordingly, it is desirable to provide a data selection device for selecting among data which has been prioritized having high speed access which is suitable for use with a semiconductor integrated circuit. The overall size of the data selection device should be reduced compared to conventional data selection devices. The logic gates should be standardized to optimize both the size of the device and reduce manufacturing costs of the device.

SUMMARY OF THE INVENTION

Generally speaking, in accordance with the invention, a device for selecting selectable data having the highest prioritized value from a plurality of data having prioritized values is provided. The device includes $M+1$ stage in which $M>1$. Each of the stages has a storage device for storing data which is selectable and nonselectable associated with one of the prioritized values. Logic circuitry is provided within each stage except the first stage for selecting between data stored within its own stage and another stage of the device. The output from the logic circuit associated with the $(M+1)$ stage represents the selectable data having the highest prioritized value.

The data selection device compares whether selectable data exists in either of two successive prioritized stages and selects the selectable data existing in the highest prioritized stage. The comparison and selection between selectable data in successive prioritized stages is repeated M times during one access cycle rather than requiring a comparison of all stages at one time as required by device 50.

The logic circuitry in at least M stages includes a detecting device for indicating whether the storage device in these M stages has outputted (i.e. made available) selectable data stored therein. The logic circuitry also includes gate circuitry. In a first embodiment of the invention, the gate circuitry is responsive to the detecting device of a previous stage for selecting selectable data outputted from the storage device of the previous stage over data outputted from the storage device of its own stage and for selecting selectable data outputted from the storage device of its own stage when nonselectable data is outputted from the storage means of the previous stage. In an alternative embodiment of the invention, the gate circuitry is responsive to the detecting means of its own stage for selecting selectable data outputted from the storage means of its own stage over selectable data outputted from the storage means of a previous stage and for selecting selectable data outputted from the storage means of the previous stage when nonselectable data is outputted from the storage means of its own stage.

In one feature of the invention a pair of clock signals are provided which have the same frequency and are out of phase with each other. The gate circuitry of each odd numbered stage in both embodiments of the invention includes dynamic type latches which are responsive to a first of the pair of clock signals for temporary storage of data chosen by the logic means of each odd numbered stage, respectively. The gate circuitry of each even numbered stage in both embodiments of the invention includes dynamic type latches which are responsive to a second of the pair of clock signals for temporary storage of data chosen by the even numbered stages, respectively.

The device is especially useful in combination with a cathode ray tube which produces a beam for forming an image on a screen of the cathode ray tube. A counter of the device produces a count value corresponding to the position of the beam along a horizontal scanning line of the screen. Each stage also includes additional latches for storing the count value and a prioritized value associated with the data stored in that stage and control circuitry responsive to the count value equaling the prioritized value for producing an enabling signal in response thereto. The enabling signal triggers output of data stored in the storage device.

Accordingly, it is an object of the invention to provide a data selection device which provides high speed access to prioritized data.

It is another object of the invention to provide an improved data selection device which reduces the size of the device compared to conventional data selection devices.

It is a further object of the invention to provide an improved data selection device which is easier to manufacture by providing standardization of the logic gates used therein.

Still other objects and advantages of the invention will in part be obvious and will in part be apparent from the specification.

The invention accordingly comprises the several steps in a relation of one or more of such steps with respect to each of the others, and the apparatus embodying features of construction, a combination of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 2:
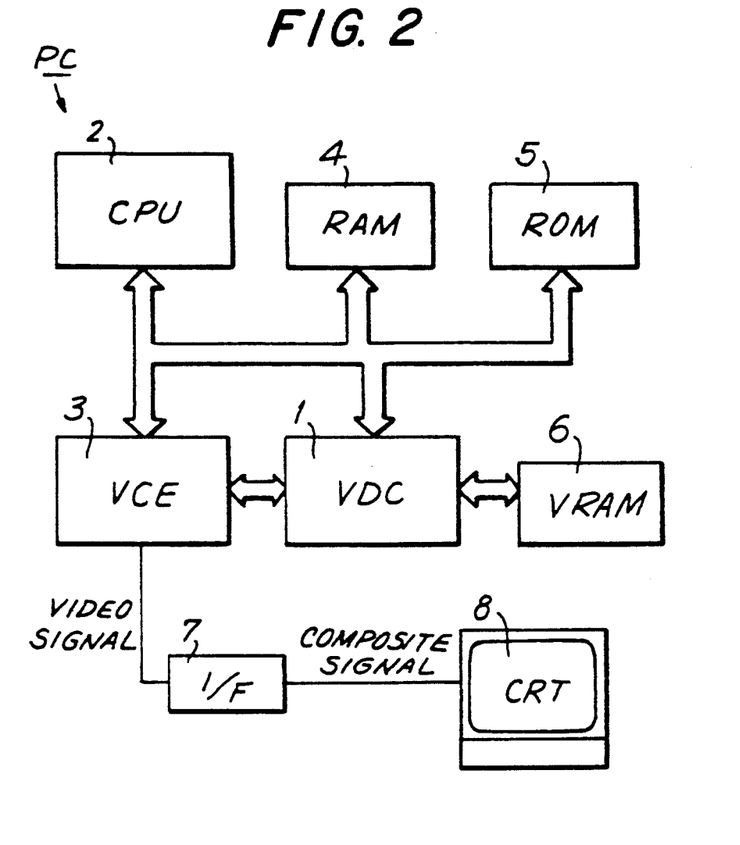
FIG. 2 is a block diagram of a personal computer in accordance with the invention.

As shown in FIG. 2, a personal computer PC includes, in part, a video display control unit (VDC) 1, a central processing unit (CPU) 2, and a video color encoder (VCE) 3. VDC 1 reads out video data stored in a video random access memory (VRAM) 6. The video data corresponding to the video image readout is then supplied by VDC 1 to VCE 3. CPU 2 processes the video data in VCE 3 based on a program stored in a read only memory (ROM) 5. The processed video data such as, but not limited to, x-coordinate, pattern and pattern number is then temporarily stored in a random access memory (RAM) 4 based upon VDC 1 receiving read/write control instructions from CPU 2 in RAM 4.

Based on the inputted color data received by VCE 3 stored temporarily in RAM 4, a video output signal (i.e. luminance and video color difference signals) is provided to a cathode ray tube (CRT) 8 through an interface (I/F) 7.

Figure 3:
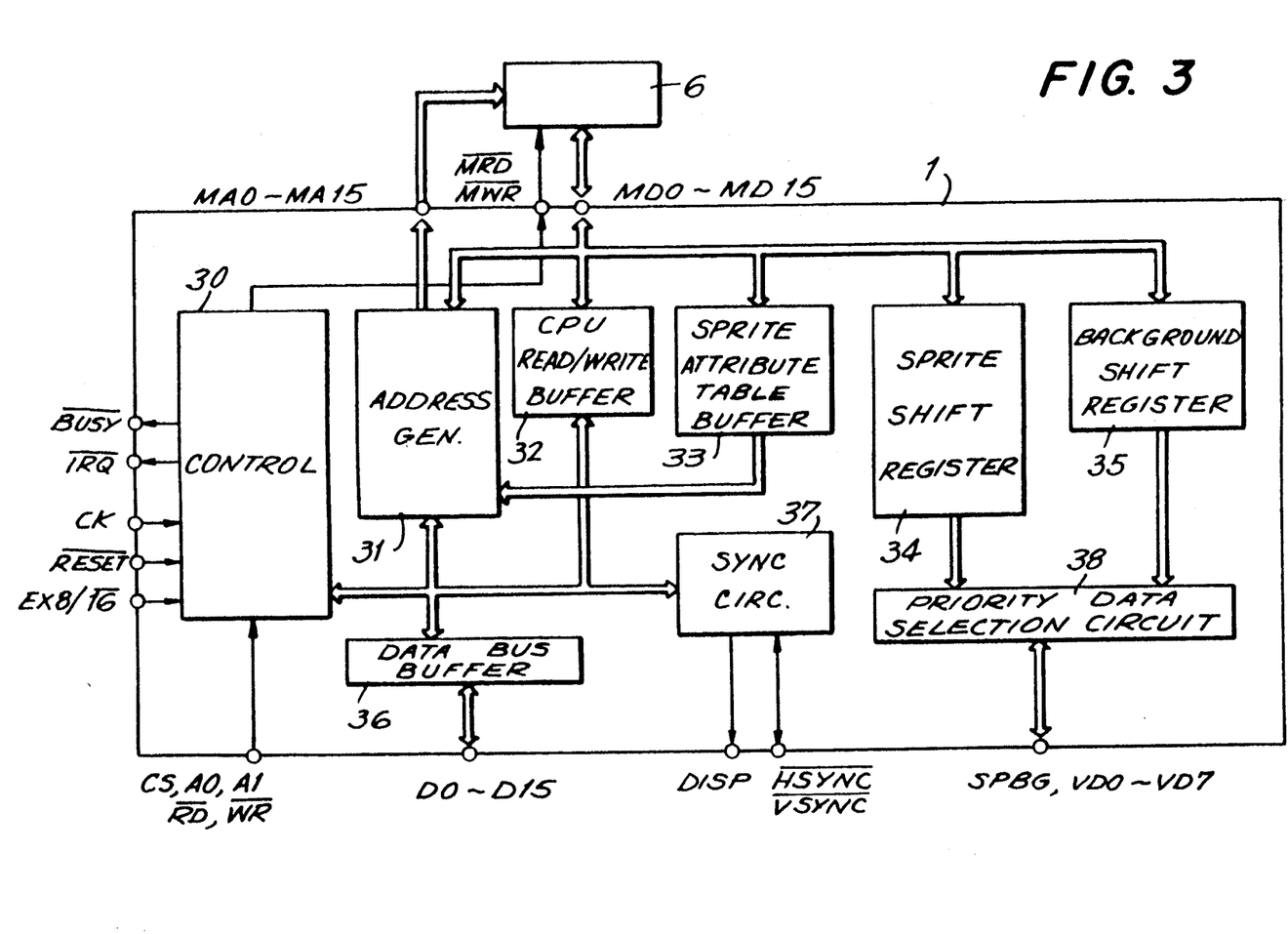
FIG. 3 is a block diagram of a video display control device in accordance with the invention.

As shown in FIG. 3, VDC 1, which is formed as a 1-chip integrated circuit, includes a control circuit 30, address generating unit 31, a CPU read/write buffer 32 and a sprite attribute table buffer 33. VDC 1 also includes a sprite shift register 34, a background shift register 35, a data buffer 36, a synchronous circuit 37 and a priority data selection circuit 38.

Control circuit 30 includes a $\overline{BUSY}$ terminal to indicate to CPU 2 that VDC 1 is not ready to accept any further data and for CPU 2 to wait before reading data into VDC 1 from VRAM 6. An $\overline{IRQ}$ terminal provides an interrupt request signal. A CK terminal of control circuit 30 inputs a clock signal equal to the frequency at which a beam of CRT 8 travels along a horizontal scanning line (i.e. at one dot frequency). A $\overline{RESET}$ terminal serves as an input for receiving a reset signal for initialization of control circuit 30. An EX 8/16 terminal receives a data bus width switching signal for selecting a data bus width of either 8 or 16 bits.

Address generating unit 31 is coupled to a plurality of terminals MA0-MA15 for outputting an address signal to VRAM 6. VRAM 6 includes an addressing area corresponding to 65,536 words of storage therein; each word consisting of sixteen bits. Address generating unit 31, CPU read/write buffer 32, sprite attribute table buffer 33, sprite shift register 34 and background shift register 35 are each coupled to a plurality of data terminals MD0-MD15 of VDC 1. Data is inputted and outputted between VDC 1 and VRAM 6 through terminals MD0-MD15.

Sprite attribute table buffer 33 serves as the internal memory for VDC 1 for storing the display position (x-y coordinates), color, pattern number and the like of sprites which cover an area of 16×16 dots on the screen of CRT 8. After receiving the sprite display position (x-y coordinates), pattern number, color and the like, sprite attribute table buffer 33 accesses VRAM 6 during a horizontal blanking period of the raster preceding the raster to be displayed with the sprite pattern data. The sprite pattern data is then read out from VRAM 6 and stored in sprite shift register 34. Additionally, the X-coordinates and color data for the sprite which are stored in sprite attribute table buffer 33 are transferred to sprite shift register 34.

As the raster which includes the sprite is about to be displayed, a horizontal dot clock counter produces a count number corresponding to a particular position along the horizontal scanning line of the screen of CRT 8. When the X-coordinate of a particular dot matches the count of the horizontal dot clock counter, the pattern data stored for that dot is outputted from sprite shift register 34 and supplied to priority data selection circuit 38. Priority data selection circuit 38 selects the sprite pattern data having the highest priority from a plurality of sprite shift registers.

Address generating unit 31 writes into VRAM 6 the addresses of the sprite pattern data stored in sprite attribute table buffer 33. The addresses for the background video display are produced by a character generator (not shown) based on the sprite addresses read from address generator 31. The background video display is read out from VRAM 6 and stored in background shift register 35.

Data bus buffer 36 is coupled to a plurality of data terminals D0-D15 through which data is inputted to and outputted from VDC 1. The read/write of data from and to CPU 2 is carried out through data bus buffer 36. An 8 bit interface with VDC 1 is achieved by using data terminals D0-D7. A 16 bit interface is achieved using data terminals D0-D15.

Synchronous circuit 37 which provides the synchronization between address generator 31, CPU read/write buffer 32, control circuit 30 and data bus buffer 36 includes a terminal DISP which provides an output signal when outputting display information through I/F 7 to CRT 8. An input/output terminal $\overline{VSYNC}$ outputs a trigger signal which triggers CRT 8 for vertical synchronization thereof and receives external vertical synchronization signals. An output/input terminal $\overline{HSYNC}$ of synchronization circuit 37 outputs a trigger signal for triggering CRT 8 for horizontal synchronization of the display data outputted by VDC 1 and receives external horizontal synchronization input signals.

Priority circuit 38 is coupled to a plurality of video data output terminals VD0-VD7. Priority circuit 38 is also coupled to a terminal SPBG which outputs a high logic level (i.e. a logic level of 1) when the video data is sprite data from sprite shift register 34. Terminal SPBG outputs a low logic level (i.e. a logic level of 0) when the video data represents background data from background shift register 35. The sprite data outputted from sprite shift register 34 and the background information outputted from background shift register 35 are stored in separate registers of priority circuit 38.

Control circuit 30 also includes an input terminal $\overline{CS}$ for reading from CPU 2 and writing into internal registers (not shown) of control circuit 30 or for reading from the internal registers of control circuit 30 and writing into CPU 2. The logic level at input terminal $\overline{CS}$ can be set up so that a low logic level (i.e. a logic level of 0) represents reading from CPU 2 and writing into the internal registers of control circuit 30 or of reading from the internal registers of control circuit 30 and writing into CPU 2. Alternatively, a high logic level (i.e. a logic level of 1) can be set up to represent reading from the internal registers of control circuit 30 and writing into CPU 2 or reading from CPU 2 and writing into the internal registers of control circuit 30. VDC 1 also includes a pair of terminals A0 and A1 which are coupled to an address bus (not shown) of CPU 2. The kind of data bus signal selected is based on a combination of signals provided at a pair of $\overline{RD}$ and $\overline{WR}$ terminals. VDC 1 also includes a pair of terminals $\overline{MRD}$ and $\overline{MWR}$. Terminal $\overline{MRD}$ is an output terminal at which timing signals are provided when VDC 1 reads out data from VRAM 6. Terminal $\overline{MRW}$ is an output terminal at which timing signals are provided by VDC 1 when the data is written into VRAM 6.

Figure 4:
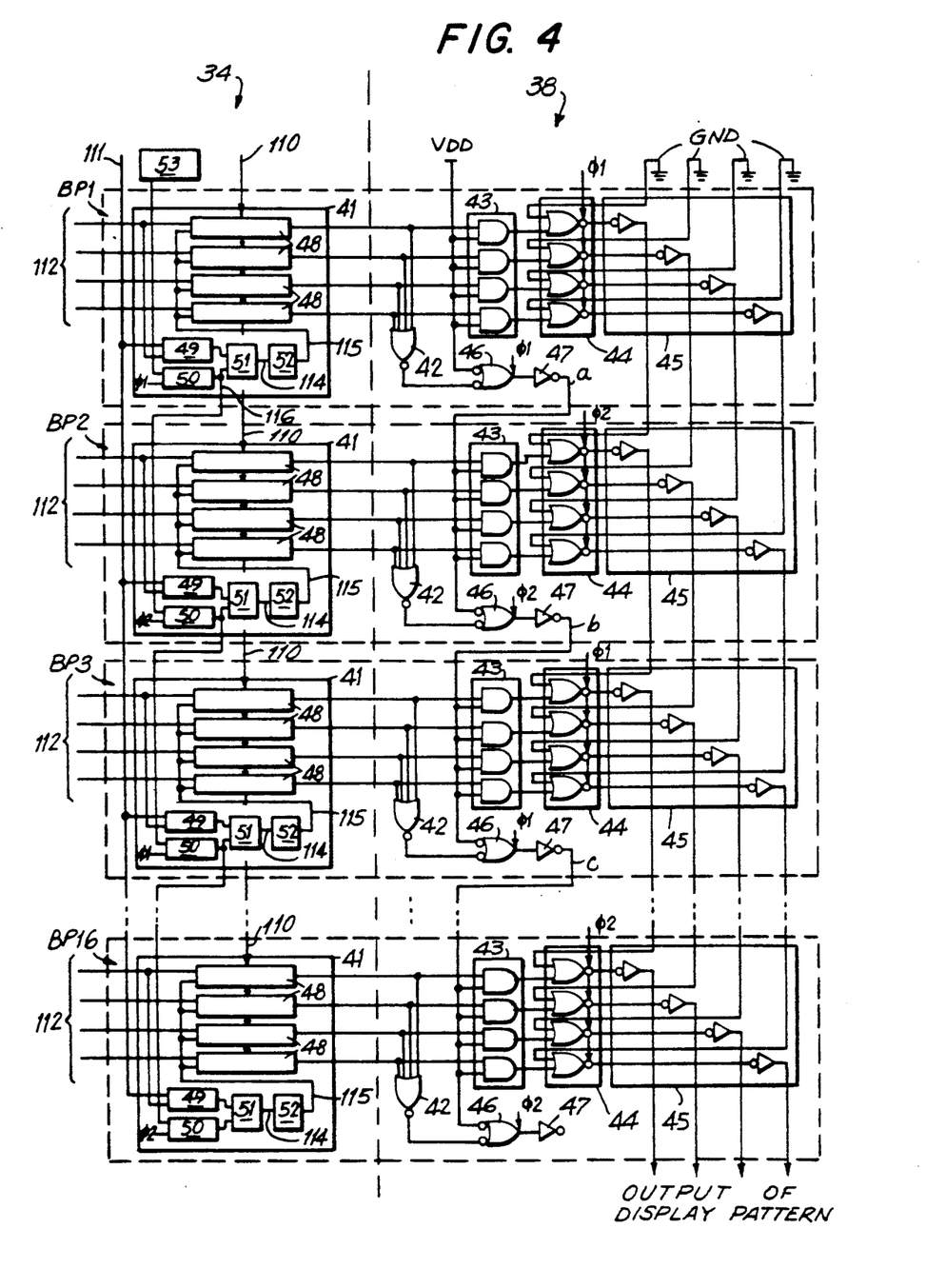
FIG. 4 is a circuit diagram of a data selection device in accordance with one embodiment of the invention.

Referring to FIG. 4, a first embodiment of sprite shift register 34 and a portion of priority data selection circuit 38 are shown. Sprite shift register 34 includes sixteen circuit blocks BP1, BP2,...,BP16 denoted by dashed lines. Each circuit block includes a pattern shift circuit 41, a NOR gate 42, an AND circuit 43 having four individual AND gates, a clocked NOR circuit 44 including four individual clocked NOR gates and an inverter circuit 45 having four individual inverters. Each circuit block also includes a clocked OR gate 46 having inverted inputs and an inverter 47. OR gate having inverted inputs indicates a NAND gate. OR gate 46 with its inverted inputs and inverter 47 when taken together from a clocked AND gate. A latch circuit 49, a latch circuit 50, a comparator 51 and a clock control circuit 52 are also included within each circuit block.

Each pattern shift circuit 41 includes four shift registers 48 having a sixteen dot length. The outputs of each pattern shift circuit 41 are fed to the associated NOR gate 42 and AND circuit 43 of each circuit block. Each of the four shift registers 48 receive sprite pattern data along parallel lines 110 in accordance with a read-in clock signal CK (see FIG. 6) along lines 112. The display coordinate (i.e. x-coordinate) of the sprite pattern data stored in pattern shift registers 48 of each pattern shift circuit 41 is supplied from line 111 and stored within the corresponding latch circuit 49. The data stored in each latch circuit 49 is clocked-in based on clock signal CK supplied along lines 112.

Figure 6:
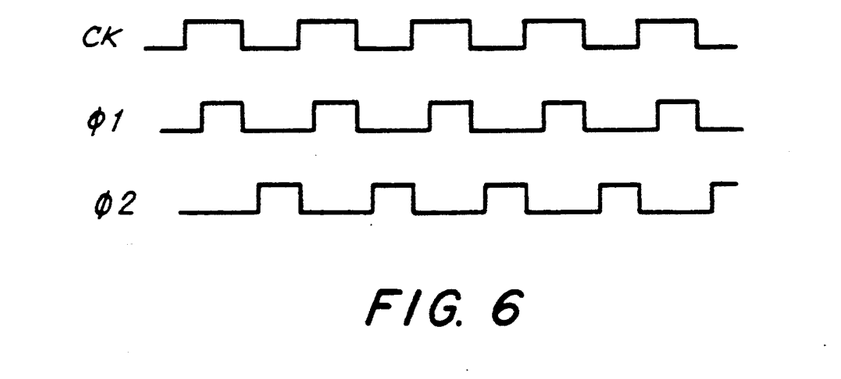
FIG. 6 is a timing chart of signals applied to the data selection devices of FIGS. 4 and 5.

A horizontal dot counter 53 similar to the horizontal dot counter 19 of FIG. 1 is connected to an input of latch circuit 50 of circuit block BP1 and is clocked therein based on a clock signal $\phi 1$ of FIG. 6. The output from each latch circuit 50 in circuit blocks BP1-BP15 is connected as an input to that latch circuit 50 of the next higher numbered BP circuit block.

In each BP circuit block, comparator 51 compares the count stored in latch circuit 50 with the value of the X-coordinate stored in latch circuit 49. A detecting signal 114 is outputted to clock control circuit 52 when the values stored within latches 49 and 50 are the same. When detecting signal 114 is present, clock control circuit 52 provides a control clock signal 115 to enable serial output of the pattern data stored in shift registers 48.

The outputs from each of the four shift registers 48 of each circuit block are connected as inputs to unclocked NOR gate 42 and as inputs to four corresponding gates of AND circuit 43. Each of the four gates of AND circuit 43 is also connected to a voltage source $V_{DD}$. The four outputs from the gates of AND circuit 43 are connected as first inputs to the four corresponding gates of clocked NOR circuit 44. The second inputs of the four gates of NOR circuit 44 are grounded or connected to some other appropriate reference voltage level. Each of the four outputs from clocked NOR circuit 44 are connected, respectively to one of the four inverters of inverter circuit 45.

The output from NOR gate 42 is connected to an inverted input of OR gate 46 for each circuit block BP1-BP16. The clocked output of OR gate 46 is applied as an input to inverter 47. The other inverted input of OR gate 46 is connected to voltage source $V_{DD}$. In circuit blocks BP2-BP16, the second inputs of the four gates of AND circuit 43 are connected to the outputs of inverters 47 from the previous BP circuit block. Additionally, in circuit blocks BP2-BP16 the second inputs of the four gates of NOR circuit 44 are connected to the four inverters of inverter circuit 45 of the previous circuit block, respectively. The second inputs of the four gates of NOR circuit 44 of circuit block BP1 are connected to ground or some other reference voltage level. The outputted display pattern is provided from the four output lines of inverter circuit 45 of circuit block BP16.

As shown in FIG. 6, clock signals $\phi 1$ and $\phi 2$ are both at logic levels of 1 and 0 during one cycle of clock signal CK. Clock signals $\phi 1$ and $\phi 2$, however, are not at logic levels of 1 at the same time. Clock signal $\phi 1$ is applied to latch circuit 50, the outputs of the gates of NOR circuit 44 and the output of NOR gate 46 of circuit blocks BP1, BP3, BP5,...,BP15. Clock signal $\phi 2$ is applied to latch circuit 50, the outputs of the gates of NOR circuit 44 and OR gate 46 of circuit blocks BP2, BP4,...,BP16. When clock signal $\phi 1$ is at a low logic level, the outputs of NOR circuits 44 and OR gates 46 of circuit blocks BP1, BP3, ... BP15 are unable to change logic levels. When clock signal $\phi 1$ is at a logic level of 1, the outputs of NOR circuits 44 and OR gates 46 of circuit blocks BP1, BP3, ... BP15 are free to change logic levels Similarly, when clocks signal $\phi 2$ is at a high logic level, the outputs of NOR circuit 44 of circuit blocks BP2, BP4,...,BP16 and OR gate 46 of circuit blocks BP2, BP4,...,BP14 are free to change logic levels. Therefore, NOR circuits 44 and OR gates 46 of priority data selection circuit 38 operate as dynamic types of latch circuits.

During the horizontal blanking period before display of the sprite pattern data on CRT 8, the sprite pattern data is read out from VRAM 6 and supplied through lines 110 to shift registers 48 of each circuit block. VDC 1 also reads out the X-coordinates of the sprite information stored in sprite attribute table buffer 33 and supplies the same through line 111 to latch circuits 49 in each BP circuit block. The storage of the sprite pattern data and X-coordinates is repeated sixteen times to fill in the sixteen different pattern shift circuits 41. When clock control circuit signal 115 is present, each shift register 48 serially outputs the sprite pattern data stored therein.

Assuming that selectable data from pattern shift circuit 41 of circuit block BP1 exists (i.e. a logic level of 1 is outputted from one of the four shift registers 48) a signal "a" produced by inverter 47 is at a logic level of 0 while clock signal $\phi 1$ is at a high logic level of 1. The selected data produced by shift registers 48 of pattern shift circuit 41 of circuit block BP1 is also provided as the output across inverter circuit 45 of circuit block BP1.

Signal "a" of inverter 47 is maintained at a logic level of 0 once clock signal $\phi 1$ changes to a low logic level of 0. Signal "a" forces a logic level of 0 to be produced by the gates of AND circuit 43 of circuit block BP2. Therefore, the outputs of inverter circuit 45 of circuit block BP2 are the same as the outputted data produced by inverter circuit 45 of circuit block BP1 (i.e. the data from shift register 48 of circuit block BP1).

With signal "a" maintained at a logic level of 0 while clock signal $\phi 2$ is at a high logic level of 1, signal "b" produced by inverter 47 of circuit block BP2 is at a logic level of 0. Signal "b" is provided as an input signal to the gates of AND circuit 43 of circuit block BP3. Signal "b" will be maintained at a logic level of 0 once clock signal $\phi 2$ assumes a low logic level, forcing the outputs of AND circuit 43 to assume logic levels of 0. Accordingly, the selectable data produced by shift registers 48 of circuit block BP1 will be outputted from inverter circuit 45 of circuit block BP3.

Since signal "b" is at a logic level of 0 when clock signal $\phi 2$ is at a low logic level, a signal "c" produced by inverter 47 of circuit block BP3 assumes a logic level of 0, resulting in the selectable data produced by shift register 48 of circuit block BP1 being outputted from inverter circuit 45 of circuit block BP3. The output signal from each inverter 47 of each remaining (i.e. higher numbered) BP circuit block also will assume a logic level of 0 based on the foregoing scheme. Any selectable data which may be stored in these remaining circuit blocks will be prevented from reaching the outputs of their corresponding inverter circuit 45 due to the low logic level outputted from each inverter 47 being fed as inputs to AND circuits 43 of the next higher numbered BP circuit block. Therefore, sprite pattern shift data stored in circuit block BP1 will be outputted from inverter circuit 45 of circuit block BP16 whenever it exists.

In the event that no selectable data exists in circuit block BP1, selectable data existing in BP2 becomes of the highest priority and will be outputted from inverter circuit 45 of circuit block BP16. That is, when no selectable data exists in circuit block BP1, signal "a" is at a logic level of 1 so that selectable data outputted from pattern shift circuit 41 of circuit block BP2 will appear across the outputs of inverter circuit 45 of circuit block BP2. At the same time, the output from inverter 47 of circuit block BP2 will be at a logic level of 0 resulting in signal "b" being at a logic level of 0. With signal "b" being at a logic level of 0, all inverters 47 of each higher numbered BP circuit block assume a logic level of 0. Any selectable data stored in circuit blocks BP3-BP16 is prevented from reaching the output of their corresponding inverter circuits 45 for the same reasons as discussed above. Therefore, the selectable data stored in circuit block BP2 appears across the outputs of inverter circuit 45 of BP16.

As can now be readily appreciated, sprite pattern data stored in circuit block BP1 is of the highest priority. Sprite pattern data stored in circuit blocks BP2-BP16 decreases in priority as the circuit block number increases. Sprite pattern data stored in circuit block BP16 is of the lowest priority.

Figure 5:
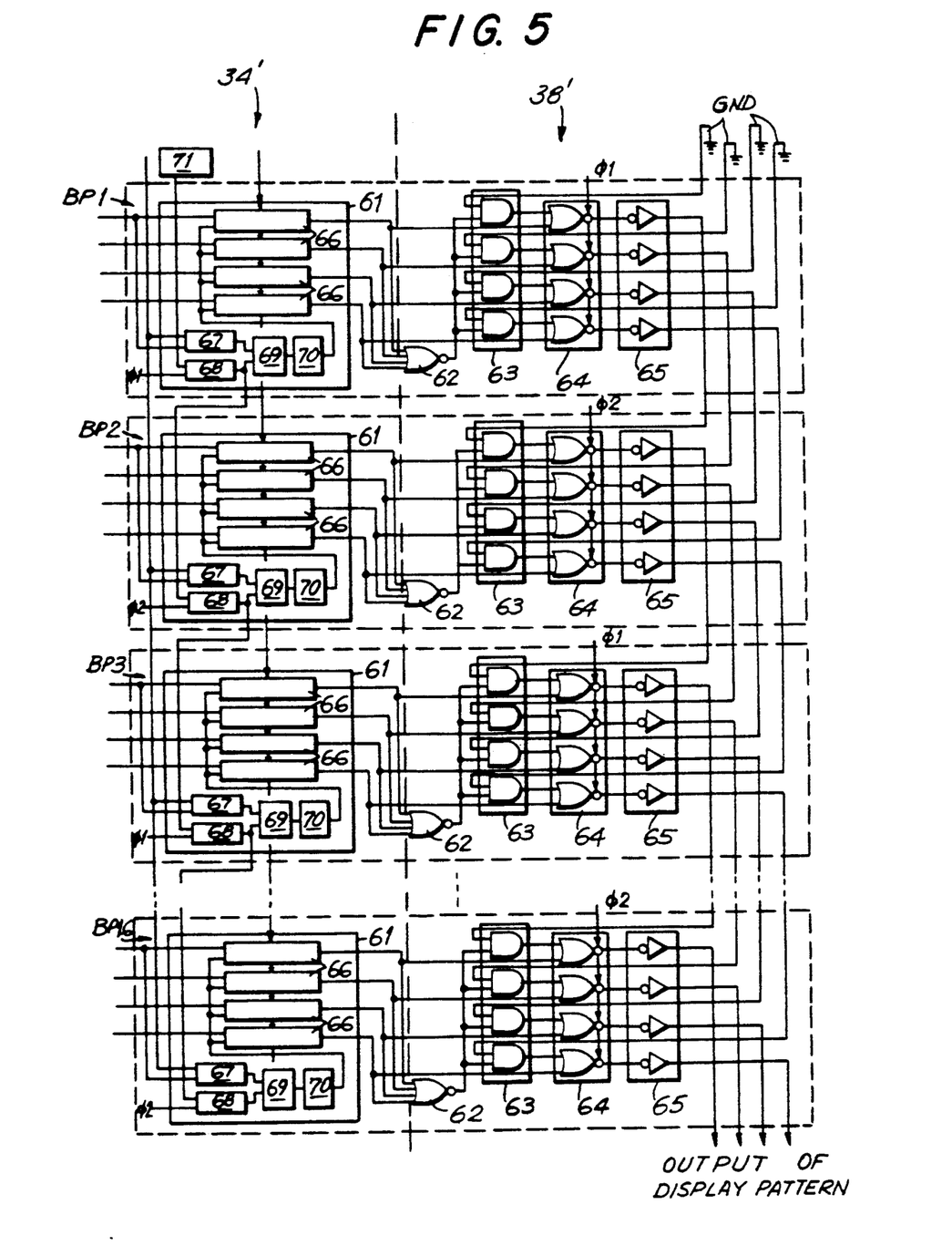
FIG. 5 is a circuit diagram of a data selection device in accordance with an alternative embodiment of the invention.

As shown in FIG. 5, an alternative priority circuit 38' is shown. Sprite shift register 34' includes a plurality of pattern shift circuits 61 which are similar to and operate in the same manner as pattern shift circuits 41 of FIG. 4. Each pattern shift circuit 61 includes latches 67 and 68, a comparator 69, a clock control circuit 70 and four shift registers 66 which are similar to and operate in the same manner as latches 49 and 50, comparator 51, clock control circuit 52 and shift registers 48 of FIG. 4, respectively. A horizontal dot counter 71 is similar to and operates in the same manner as horizontal dot counter 53 of FIG. 4. Each circuit block of priority circuit 38' includes four gates forming an AND circuit 63, four gates forming a clocked NOR circuit 64 and four inverters forming inverter circuit 65. AND circuit 63, NOR circuit 64 and inverter circuit 65 are similar to and connected to each other in the same manner as AND circuit 43, NOR circuit 44 and inverter circuit 45 are connected to each other in FIG. 4, respectively.

Each BP circuit block of priority circuit 38' also includes a NOR gate 62 which has four input terminals connected to the four output terminals of pattern shift circuit 61. The output of NOR gate 62 is connected as a first input to each of the gates of AND circuit 63. Each of the four outputs of each pattern shift circuit 61 is also connected as an input to a corresponding one of the four gates of NOR circuit 64 in each circuit block. The second input of each gate of AND circuit 63 of circuit block BP1 is grounded or at some other reference voltage level. The second inputs of the four gates of AND circuit 63 of circuit blocks BP2-BP16 are respectively connected to corresponding outputs of inverter circuit 65 from the immediately preceding (i.e. lower numbered) BP circuit block. The display pattern is outputted from inverter circuit 65 of circuit block BP16.

When selectable data is outputted from pattern shift circuit 61 of circuit block BP1 it will appear across the outputs of inverter circuit 65 when clock signal $\phi 1$ is at a logic level of 1 and thereafter will be inputted to the gates of AND circuit 63 of circuit block BP2. Clock signal $\phi 1$ which was at a high logic level assumes a low logic level and clock signal $\phi 2$ which was at a low logic level assumes a high logic level resulting in the selectable data of circuit block BP1 being maintained as inputs to the gates of AND circuit 63 of circuit block BP2.

If no selectable data exists in pattern shift circuit 61 of circuit block BP2, selectable data from circuit block BP1 will appear across the outputs of inverter circuit 65 of circuit block BP2. The selectable data of circuit block BP1 is now provided as an input to the gates of AND circuit 63 of circuit block BP3. Clock signals $\phi 1$ and $\phi 2$ once again assume high and low logic levels, respectively. Assuming no selectable data exists at the output of pattern shift circuit 61 of circuit block BP3, the selectable data of circuit block BP1 will appear across the outputs of inverter circuit 65 of circuit block BP3. When no other selectable data exists at the outputs of any other pattern shift circuit 61 of circuit blocks BP4-BP16, selectable data from circuit block BP1 will appear across the outputs of inverter circuit 65 of each circuit block BP4-BP16.

When selectable data exists in pattern shift circuits 61 of circuit blocks BP2 and BP1, selectable data from pattern shift circuit 61 of circuit block BP2 rather than pattern shift circuit 61 of circuit block BP1 will be outputted from inverter circuit 65 of circuit block BP2. More specifically, when selectable data exists in circuit block BP2, the output from NOR gate 62 will be at a low logic level which is fed as inputs to the four gates of AND circuit 63 of circuit block BP2. Since the selectable data from circuit block BP1 is also inputted to AND circuit 63 of circuit block BP2 through inverter circuit 65 of circuit block BP1, selectable data of circuit block BP1 is prevented by the low logic level of NOR gate 62 of circuit block BP2 from reaching inverter circuit 65 of circuit block BP2. In other words, selectable data outputted from pattern shift circuit 61 of circuit block BP2 has a higher priority than selectable data outputted from pattern shift circuit 61 of circuit block BP1. Selectable data outputted from pattern shift circuit 61 of circuit block BP16 has the highest priority. Selectable data from pattern shift circuit 61 of each lower numbered circuit block is of decreasing priority. Selectable data from pattern shift circuit 61 of circuit block BP1 has the lowest priority.

As now can be readily appreciated, both FIGS. 4 and 5 compare and select between sprite data stored in only two circuit blocks at one time. By repeatedly comparing and selecting sprite data stored in only two circuit blocks at one time, the highest prioritized sprite data is determined. Comparison between sprite data stored in fifteen different circuit blocks at one time, as required by data selection device 50 of the prior art, is eliminated. Accordingly, high speed access to sprite data of the highest priority is provided by the invention. The number of passing gates in a single operational cycle of clock signal CK is also reduced.

The delay time for each gate circuit in a single operational cycle of VDC 1 can be increased while still providing high speed access as compared to conventional data selection devices such as device 50. For example, at a high speed operational frequency of about 21 MHz (i.e. clock signal CK equal to 21 MHz) the comparing-/selecting operation between two consecutively numbered BP circuit blocks takes place in about a half cycle of the 21 MHz frequency (i.e. about 23 nanoseconds). The delay time of a typical gate circuit of a semiconductor integrated circuit is about 2-3 nanoseconds. About five stages of gate circuits are utilized in each BP circuit block of the invention. Consequently, sprite pattern data is delayed no more than about 10-15 nanoseconds before reaching the outputs of NOR gates 44 or 64. Comparison/selection of the highest prioritized pattern data, however, need be made within a 23 nanosecond period. Therefore, the invention provides more than enough time for the sprite data to reach NOR gate 44 or 64 before a selection must be made. Delay time for the gate circuits can even be increased while still providing stable high speed access to the prioritized sprite pattern data.

Still further, since each circuit block has the same construction, the same art work pattern can be repeated, optimizing the size of the integrated circuit and reducing the cost of manufacture due to standardization. If each circuit block is formed as a cell, the invention can be made by merely reproducing the cell. In the case of the last cell, such as BP16 in FIG. 4, unneeded gates are included but not connected to ultimate output (see NOR gate 42, OR gate 46 and inverter 47 of BP16). The size of the integrated circuit is also reduced since gates of varying sizes are not required. Signal lines can be put together by merely reproducing the cells. The wired area required for coupling the cells together is eliminated. By providing an art work pattern which can be repeated and by reducing the space required on the semiconductor chip, the invention is far more suitable for semiconductor integrated circuit applications than conventional data selection devices.

It will thus be seen that the object set forth above, and those made apparent from the preceding description, are efficiently attained and, since certain changes may be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which, as a matter of language, might be said to fall therebetween.

What is claimed is:

1. A device for selecting data having the highest priority from a plurality of data, comprising:

a plurality of storage means for storing said plurality of data and arranged in series to define M+1 stages of said storage means, wherein M≧1, each storage means of said plurality of storage means being associated with one of the M+1 stages, each stage of said M+1 stages having a stage priority relative to each of the other stages;

timing means for producing timing signals; and a plurality of logic circuit means, at least one of said logic circuit means from said plurality of logic circuit means being associated with each of the M+1 stages except for a first of the M+1 stages, each logic circuit means for comparing and selecting between data stored in storage means associated with the same stage as that logic circuit means and data provided from a previous stage of the M+1 stages based on the stage priority of that logic circuit means and the stage priority of the previous stage in response to said timing signals;

wherein the output from the logic circuit means of the M+1 stage represents data having the highest stage priority.

2. The device of claim 1, wherein the data stored in each of the storage means includes either selectable or nonselectable data, the first stage includes logic circuit means for comparing and selecting data and the logic circuit means of each of the stages except the M+1 stage includes detecting means for indicating whether selectable data has been outputted from the storage means associated with the same priority stage as the detecting means.

3. The device of claim 2, wherein the logic circuit means of each of the second through M+1 stages further includes gate means responsive to the detecting means of a previous priority stage for selecting selectable data provided by the previous priority stage over selectable data outputted from storage means of the same priority stage as the gate means and for selecting selectable data outputted from storage means of the same priority stage as the gate means when nonselectable data is provided by the storage means of the previous stage.

4. The device of claim 3, wherein the logic circuit means of each stage except the M+1 stage further includes transfer means for transferring the selectable data selected by logic circuit means of the same priority stage as the transfer means to the logic circuit means of the next stage.

5. The device of claim 4, wherein the timing signals of said timing means include first and second clock signals which have the same frequency and are out of phase with each other; said gate means being responsive to said first and second clock signals.

6. The device of claim 5, wherein the gate means of each odd numbered stage includes additional storage means responsive to the first clock signal for temporary storage of selectable data chosen by the logic means of each odd numbered stage, respectively, and wherein the gate means of each even numbered stage includes gate storage means responsive to the second clock signal for temporary storage of selectable data chosen by the logic circuit means of each even numbered stage, respectively.

7. The device of 6, wherein the detecting means of each odd numbered stage also serves as detecting storage means responsive to the first clock signal for temporary storage of a detecting signal produced by its own stage or the previous stage and wherein the detecting means of each even numbered stage serves as detecting storage means responsive to the second clock signal for temporary storage of a detecting signal produced by its own stage or the previous stage.

8. The device of claim 5, wherein the logic circuit means of the first stage further includes additional gate means for selecting data which has been outputted from the storage means of the first stage.

9. The device of claim 8, wherein the additional gate means include gate storage means responsive to the first clock signal for temporary storage of data chosen by the logic circuit means of the first stage.

10. The device of claim 9, in combination with a display device for forming an image on a screen of the display device and further including counter means for producing a count value corresponding to the position along a horizontal line of the screen, and wherein each stage includes additional storage means for storing the count value and a positional value representing the position on the screen where the data stored in the storage means is to be displayed, control circuit means responsive to the count value equaling the positional value for providing an enabling signal to the storage means and wherein the storage means includes a plurality of shift registers responsive to the enabling signal for outputting data stored therein.

11. The device of claim 8, further including simulated storage means for storing only nonselective data, said simulated storage means serving as said another stage wherein said additional gate means are responsive to said simulated storage means for always selecting the data in said first storage means regardless of whether the data in said first storage means is selectable or nonselectable.

12. The device of claim 11, in combination with a display device for forming an image on a screen of the display device and further including counter means for producing a count value corresponding to the position along a horizontal line of the screen, and wherein each stage includes additional storage means for storing the count value and a positional value representing the position on the screen where the data stored in the storage means is to be displayed, control circuit means responsive to the count value equaling the positoinal value for providing an enabling signal to the storage means and wherein the storage means includes a plurality of shift registers responsive to the enabling signal for outputting data stored therein.

13. The device of claim 3, wherein the logic circuit means of each stage are identical in configuration.

14. The device of claim 13, herein the logic circuit means of the M+1 stage include detecting means having an unconnected output terminal.

15. The device of claim 1, in combination with a display device for forming an image on a screen of the display device and further including counter means for producing a count value corresponding to the position along a horizontal line of the screen, and wherein each stage includes additional storage means for storing the count value and a positoinal value representing the position on the screen where the data stored in the storage means is to be displayed, control circuit means responsive to the count value equaling the positoinal value for providing an enabling signal to the storage means and wherein the storage means includes a plurality of shift registers responsive to the enabling signal for outputting data stored therein.

16. The device of claim 1, wherein the data stored in each of the storage means includes either selectable or nonselectable data, the first stage includes logic circuit means for comparing and selecting data and the logic circuit means of each of the second through M+1 stages further includes gate means for selecting selectable data outputted from the storage means of the previous stage over selectable data outputted from the storage means of its own stage and for selecting selectable data outputted from the storage means of its own stage when nonselectable data is outputted from the storage means of the previous stage.

17. The device of claim 16, and further including clock means for supplying to the gate means first and second clock signals which have the same frequency and are out of phase with each other.

18. The device of claim 17, wherein the gate means of each odd numbered stage includes additional storage means responsive to the first clock signal for temporary storage of selectable data chosen by the logic circuit means of each odd numbered stage, respectively, and wherein the gate means of each even numbered stage includes additional storage means responsive to the second clock signal for temporary storage of selectable data chosen by the logic circuit means of each even numbered stage, respectively.

19. The device of claim 16, wherein the logic circuit means of the first stage further includes additional gate means for selecting data which has been outputted from the storage means of the first stage.

20. The device of claim 19, further including simulated storage means for storing only nonselectable data, said simulated storage means serving as said another stage wherein said additional gate means are responsive to said simulated storage means for always selecting the data in said first storage means regardless of whether the data in said first storage means is selectable or nonselectable.

21. The device of claim 20, wherein the additional gate means include gate storage means responsive to the first clock signal for temporary storage of data chosen by the logic circuit means of the first stage.

22. The device of claim 1, wherein the first stage also includes logic circuit means for comparing and selecting data, the data stored in each of the storage means includes either selectable or nonselectable data and the logic circuit means of each stage except the M+1 stage further includes transfer means for transferring the selectable data selected by its own logic circuit means to the logic circuit means of the next stage.

23. The device of claim 2, wherein the logic circuit means of each stage are identical in configuration.

24. The device of claim 23, wherein the logic circuit means of the M+1 stage include detecting means having an unconnected output terminal.

25. The device of claim 1, wherein the first stag also includes logic circuit means for comparing and selecting data, the data stored in each of the storage means includes either selectable or nonselectable data and the logic circuit means of each stage includes detecting means for indicating whether selectable data has been outputted.

26. The device of claim 25, wherein the logic circuit means of each stage further includes gate means responsive to the detecting means of its own stage for selecting selectable data outputted from the storage means of its own stage over selectable data outputted from the storage means of a previous stage and for selecting selectable data outputted from the storage means of the previous stage when nonselectable data is outputted from the storage means of its own stage.

27. The device of claim 26, wherein the logic circuit means of each of the first M stages further includes transfer means for transferring the selectable data selected by logic circuit means of the same priority stage as the transfer means to the logic circuit means of the next stage.

28. The device of claim 27, further including clock means for supplying to the gate means first and second clock signals which have the same frequency and are out of phase with each other.

29. The device of claim 28, wherein the gate means of each odd numbered stage includes additional storage means responsive to the first clock signal for temporary storage of selectable data chosen by the logic circuit means of each odd numbered stage, respectively, and wherein the gate means of each even numbered stage includes gate storage means responsive to the second clock signal for temporary storage of selectable data chosen by the logic circuit means of each even numbered stage, respectively.

30. The device of claim 26, further including simulated storage means for storing only nonselectable data, said simulated storage means serving as said another stage wherein said gate means of said first stage are responsive to said simulated storage means for always selecting the data in said first storage means regardless of whether the data in said first storage means is selectable or nonselectable.

31. The device of claim 25, wherein the circuit means of each stage are identical in configuration.

32. The device of claim 1, wherein the logic circuit means of each stage further includes gate means for selecting selectable data outputted from the storage means of the same stage as the gate means over selectable data outputted from the storage means of a previous stage and for selecting selectable data outputted from the storage means of the previous stage when nonselectable data is outputted from the storage means of the same stage as the gate means.

33. The device of claim 32, wherein the logic circuit means of each of the first M stages further includes transfer means for transferring the selectable data selected by logic circuit means of the same priority stage as the transfer means to the logic circuit means of the next stage.

34. The device of claim 32, further including clock means for supplying to the gate means first and second clock signals which have the same frequency and are out of phase with each other.

35. The device of claim 34, wherein the gate means of each odd numbered stage includes gate storage means responsive to the first clock signal for temporary storage of selectable data chosen by the logic circuit means of each odd numbered stage, respectively, and wherein the gate means of each even numbered stage includes gate storage means responsive to the second clock signal for temporary storage of selectable data chosen by the logic circuit means of each even numbered stage, respectively.

36. The device of claim 35, in combination with a display device for forming an image on a screen of the display device and further including counter means for producing a count value corresponding to the position along a horizontal line of the screen, and wherein each stage includes additional storage means for storing the count value and a positional value representing the position on the screen where the data stored in the storage means is to be displayed, control circuit means responsive to the count value equaling the positoinal value for providing an enabling signal to the storage means and wherein the storage means includes a plurality of shift registers responsive to the enabling signal for outputting data stored therein.

37. The device of claim 32, wherein the logic circuit means of each stage are identical in configuration.

38. The device of claim 1, wherein the logic circuit means of each stage are identical in configuration.

39. The device of claim 38, wherein the logic circuit means of the M+1 stage include detecting means having an unconnected output terminal.

40. The device of claim 1, wherein when M≧2 the comparison and selection by logic circuit means in stages having storage means of priority N and N+1 occurs at different times, wherein 2≦N≦M.

41. A device for selecting selectable data having the highest priority from a plurality of data which is either selectable or nonselectable, comprising:
    a plurality of storage means for storing said plurality of data and arranged in series to define M+1 stages of said storage means, wherein M≧1, each storage means of said plurality of storage means having a priority relative to one of the other storage means, at least one of said storage means being associated with each of the M+1 stages which is either selectable or nonselectable;
    a plurality of logic circuit means, at least one of said logic circuit means of said plurality of logic circuit means being associated with one of the M+1 stages except for a first of the M+1 stages; and
    timing means for producing clock signals;
    wherein each logic circuit means is operable in responsive to the clock signals for receiving first data stored in storage means associated with the same stage as that logic circuit means and second data transferred from logic circuit means of the previous stage and for selecting the second data when the first and second data are both selectable and for selecting the first data when the second data is nonselectable, and wherein the output from the logic circuit means of the M+1 stage represents selectable data having the highest priority.

42. A device for selecting selectable data having the highest priority from a plurality of data which is either selectable or nonselectable, comprising:

a plurality of storage means for storing said plurality of data and arranged in series to define M+1 stages of said storage means, wherein M≧1, each storage means of said plurality of storage means having a priority relative to one of the other storage means, at least one of said storage means being associated with each of the M+1 stages;

a plurality of logic circuit means, at least one of said logic circuit means of said plurality of logic circuit means being associated with one of the M+1 stages except for a first of the M+1 stages; and timing means for producing clock signals;

wherein each logic circuit means is operable in responsive to the clock signals for receiving first data stored in storage means associated with the same stage as that logic circuit means and second data transferred from logic circuit means of the previous stage and for selecting the second data when the first and second data are both selectable and for selecting the second data when the first data is nonselectable, and wherein the output from the logic circuit means of the M+1 stage represents selectable data having the highest priority.

* * * * *